United States Patent
Nakashima

(10) Patent No.: US 12,249,058 B2
(45) Date of Patent: Mar. 11, 2025

(54) INSPECTION METHOD AND INSPECTION MACHINE

(71) Applicant: Panasonic Intellectual Property Management Co., Ltd., Osaka (JP)

(72) Inventor: Shinya Nakashima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 402 days.

(21) Appl. No.: 17/338,594

(22) Filed: Jun. 3, 2021

(65) Prior Publication Data

US 2021/0390684 A1 Dec. 16, 2021

(30) Foreign Application Priority Data

Jun. 12, 2020 (JP) ................................ 2020-102355

(51) Int. Cl.
  *G06T 7/00* (2017.01)
  *H04N 23/56* (2023.01)
(52) U.S. Cl.
  CPC .............. *G06T 7/0004* (2013.01); *G06T 7/97* (2017.01); *H04N 23/56* (2023.01); *G06T 2207/20221* (2013.01)
(58) Field of Classification Search
  CPC ............. G06T 7/97; G06T 2207/20221; G06T 7/0004; H04N 23/56
  See application file for complete search history.

(56) References Cited

U.S. PATENT DOCUMENTS

| 10,248,853 B2 * | 4/2019 | Kawahara | G06T 7/231 |
| 2006/0159330 A1 | 7/2006 | Sakai et al. | |
| 2008/0055600 A1 * | 3/2008 | Kawaguchi | G01N 21/8806 356/407 |
| 2013/0128026 A1 * | 5/2013 | Hirose | G01N 21/8903 348/125 |
| 2013/0294677 A1 | 11/2013 | Urano et al. | |
| 2015/0369752 A1 * | 12/2015 | Honda | G01N 21/9501 356/237.2 |
| 2021/0174117 A1 * | 6/2021 | Hever | H04N 7/181 |

FOREIGN PATENT DOCUMENTS

| JP | 2010-151824 | 7/2010 |
| JP | 2011-95171 | 5/2011 |
| JP | 2012-112915 | 6/2012 |
| JP | 5172162 B | 3/2013 |
| JP | 2014-149177 | 8/2014 |

* cited by examiner

*Primary Examiner* — Edward F Urban
*Assistant Examiner* — Ashley L. Hytrek
(74) *Attorney, Agent, or Firm* — Wenderoth, Lind & Ponack, L.L.P.

(57) ABSTRACT

An inspection machine includes image sensors that image a sheet, a lighting device that irradiates the sheet with light, and an image processing device that generates an image of an object from outputs of the image sensors. The image processing device generates captured images that include an image in a predetermined range of the sheet in common based on the outputs from the image sensors. The image processing device extracts images of the object on the sheet for each of the generated captured images. The image processing device associates the extracted images of the object with each other based on a feature amount of the object reflected in the images. The image processing device combines the associated images of the object with each other.

7 Claims, 9 Drawing Sheets

Plan view illustrating marker positions

Captured images in preprocessing

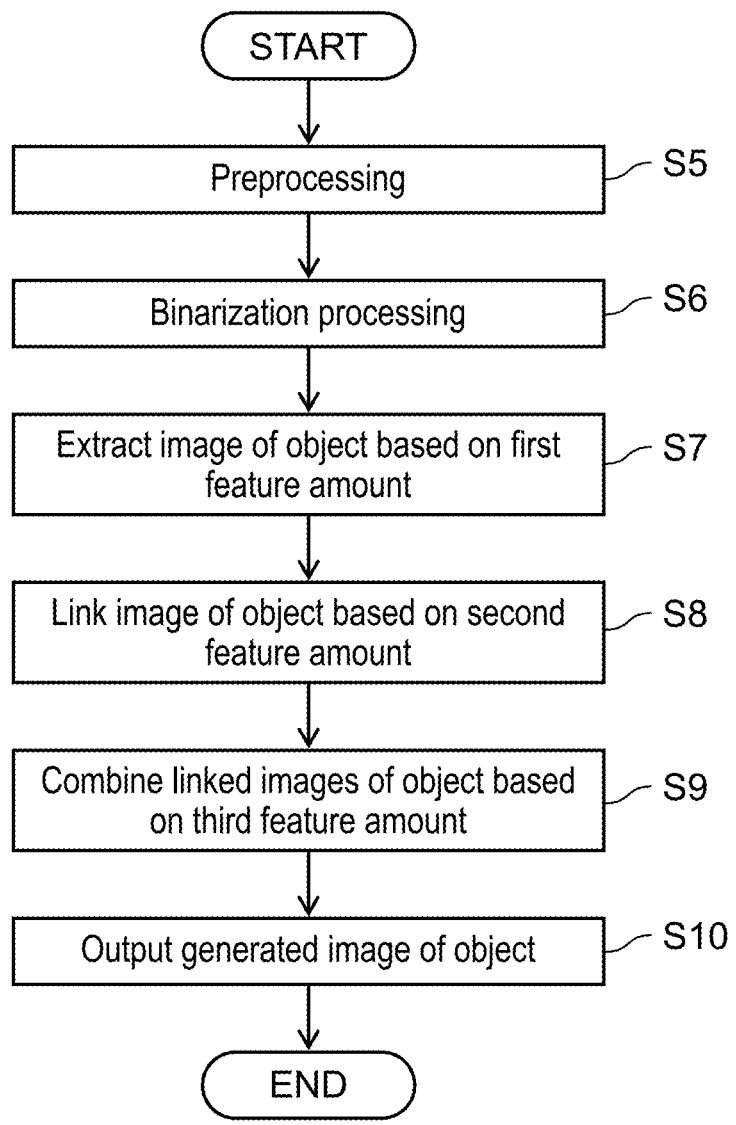

FIG. 9A
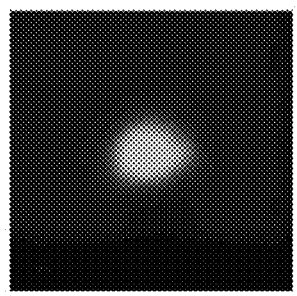 ← E
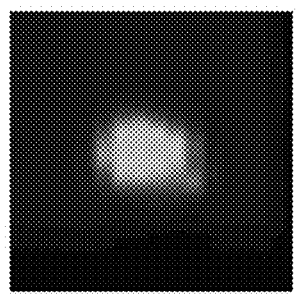 ← E
FIG. 9B
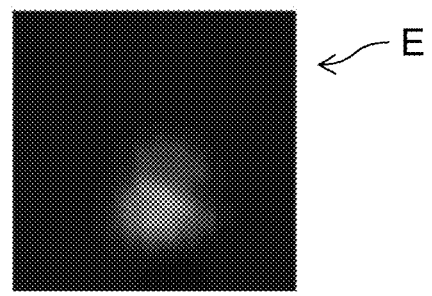 ← E
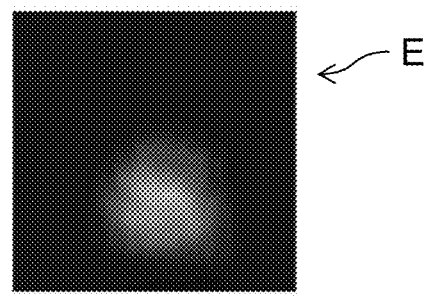 ← E
FIG. 10
| Type of sensor | Type of image | Optical system | Evaluation |
|---|---|---|---|
| Area sensor | Moving image | Dark field | B |
| | | Bright field | C |
| | Still image | | C |
| Line sensor | Moving image | Dark field | A |
| | | Bright field | C |

INSPECTION METHOD AND INSPECTION MACHINE

BACKGROUND

1. Technical Field

The present disclosure relates to an inspection machine and an inspection method for an inspection object using a plurality of image sensors, which improves the detection reproducibility and detection probability of an object in the inspection object.

2. Description of the Related Art

In the fields of devices such as semiconductors, electronic devices, and secondary batteries, defect detectors that detect an object (foreign matter, defect, and the like) in an inspection object by using a photoelectric conversion type image sensor are known.

In recent years, in these fields, the size of foreign matter and defects in the inspection object has become smaller due to higher precision and miniaturization of products. Production efficiency and quality improvement are required, and along with this, speeding up of the manufacturing process and improvement of yield are required. In order to speed up the manufacturing process and improve the yield, high resolution and high responsiveness of an image sensor are required.

However, a large amount of development cost and development period are required to manufacture an image sensor with high resolution and high responsiveness. Therefore, in Japanese Patent No. 5172162, a high-speed detector is realized by disposing a plurality of image sensors side by side for simultaneous processing.

SUMMARY

According to an exemplary embodiment of the present disclosure, there is provided an inspection machine that inspects an inspection object by detecting a size of an object in the inspection object, the inspection machine including: a plurality of image sensors that image the inspection object; a lighting device that irradiates the inspection object with light; and an image processing device that generates an image of the object from outputs of the plurality of image sensors, the outputs being results of the imaging by the plurality of image sensors, wherein the image processing device: generates a plurality of captured images including images of a predetermined range of the inspection object in common in accordance with the outputs of the plurality of image sensors, extracts images of the object in the inspection object from the plurality of generated captured images, associates at least two of the images extracted by the image processing device with each other based on feature amounts of the object reflected in the images extracted, and combines, with each other, the at least two of the images associated by the image processing device.

According to an exemplary embodiment of the present disclosure, there is provided an inspection method for inspecting an inspection object by detecting a size of an object in the inspection object by using an inspection machine including a plurality of image sensors that image the inspection object, a lighting device that irradiates the inspection object with light, and an image processing device that generates an image of the object in the inspection object from outputs of the plurality of image sensors, the outputs being results of the imaging by the plurality of image sensors, the method comprising: generating a plurality of captured images including images of a predetermined range of the inspection object in common in accordance with the outputs of the plurality of image sensors; extracting images of the object in the inspection object from the plurality of generated captured images; associating at least two of the images extracted in the extracting with each other based on feature amounts of the object reflected in the images extracted; and combining, with each other, the at least two of the images associated in the associating.

BRIEF DESCRIPTION OF THE DRAWINGS

FIG. 7 is a flowchart for illustrating a flow of an image extraction method of an object and an image combining method of the object in the image processing device according to the present exemplary embodiment;

FIG. 9A is a view illustrating a combined image of an object output by the inspection machine according to the present exemplary embodiment;

FIG. 9B is a view illustrating a combined image of an object output by an inspection machine in a related art; and FIG. 10 is a view for illustrating a relationship between a type of sensor, a type of moving image, and an optical system in the inspection machine according to the present exemplary embodiment.

DETAILED DESCRIPTIONS

In Japanese Patent No. 5172162, in order to accurately detect an object, a plurality of images output from an image sensor are combined to generate a high-definition image. In Japanese Patent No. 5172162, images are combined after offsetting (correcting) the positions of a plurality of images based on the disposition of image sensors.

However, for example, when the direction of the light emitted by a lighting device is not constant, or when an inspection object is three-dimensional, the way the light hits the inspection object may not be constant. In such a case, the position of the object may greatly shift in the plurality of images output from image sensors. Therefore, there is a possibility that the object cannot be detected when it is not possible to correct the displacement of the position of the object by correcting the positions of the plurality of images based on the disposition of image sensors.

In particular, when the inspection object is inspected while the inspection object is being transported, the position of the object is likely to shift.

An object of the present disclosure is to improve the detection reproducibility and detection probability of an object in an inspection object in an inspection machine and an inspection method using a plurality of image sensors.

Hereinafter, an exemplary embodiment of the present disclosure will be described in detail with reference to drawings. The following description of a preferred exemplary embodiment is merely exemplary and is not intended to limit the present disclosure, the applications or use thereof.

Figure 1:
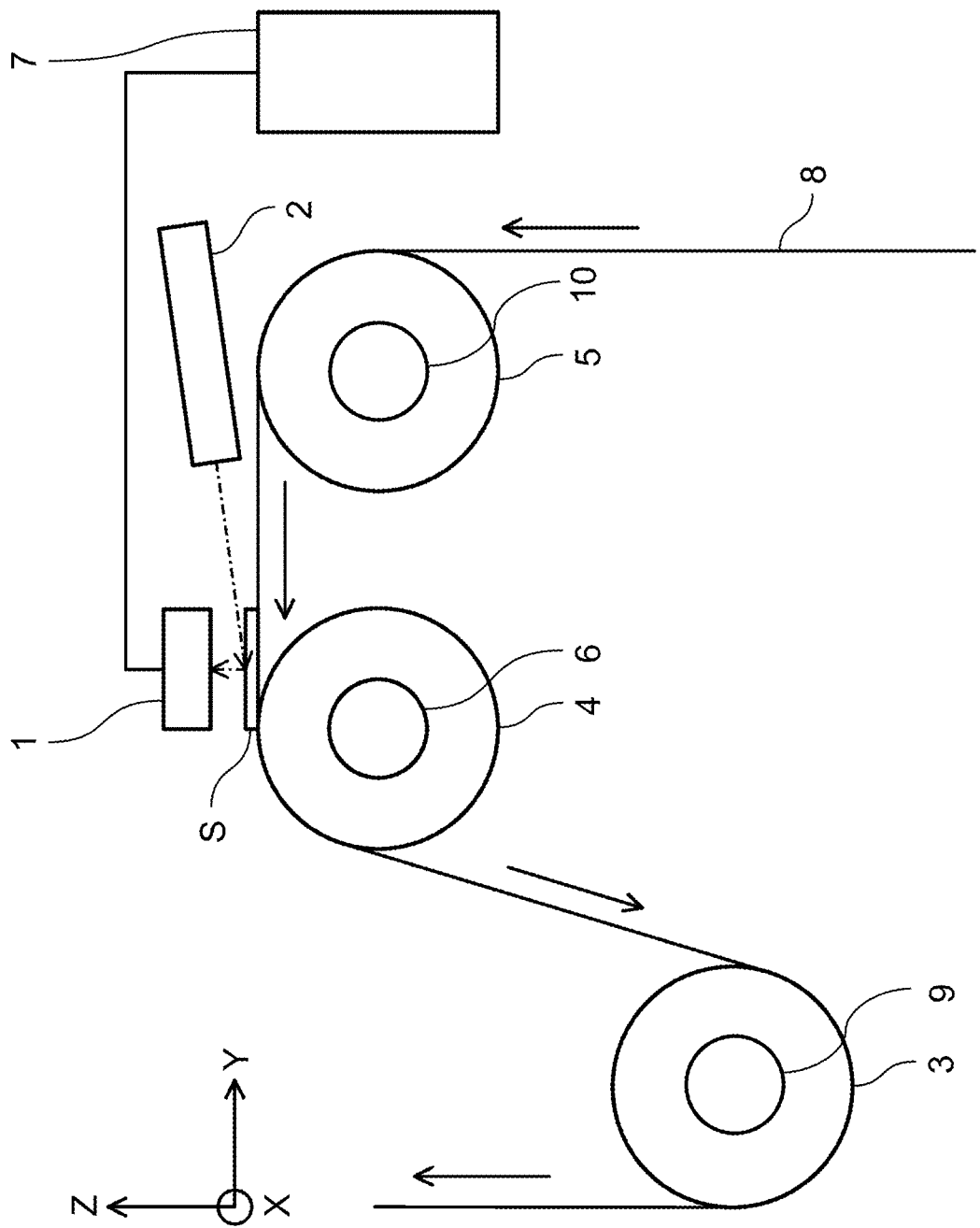
FIG. 1 is a side view of an inspection machine according to the present exemplary embodiment.
Figure 2:
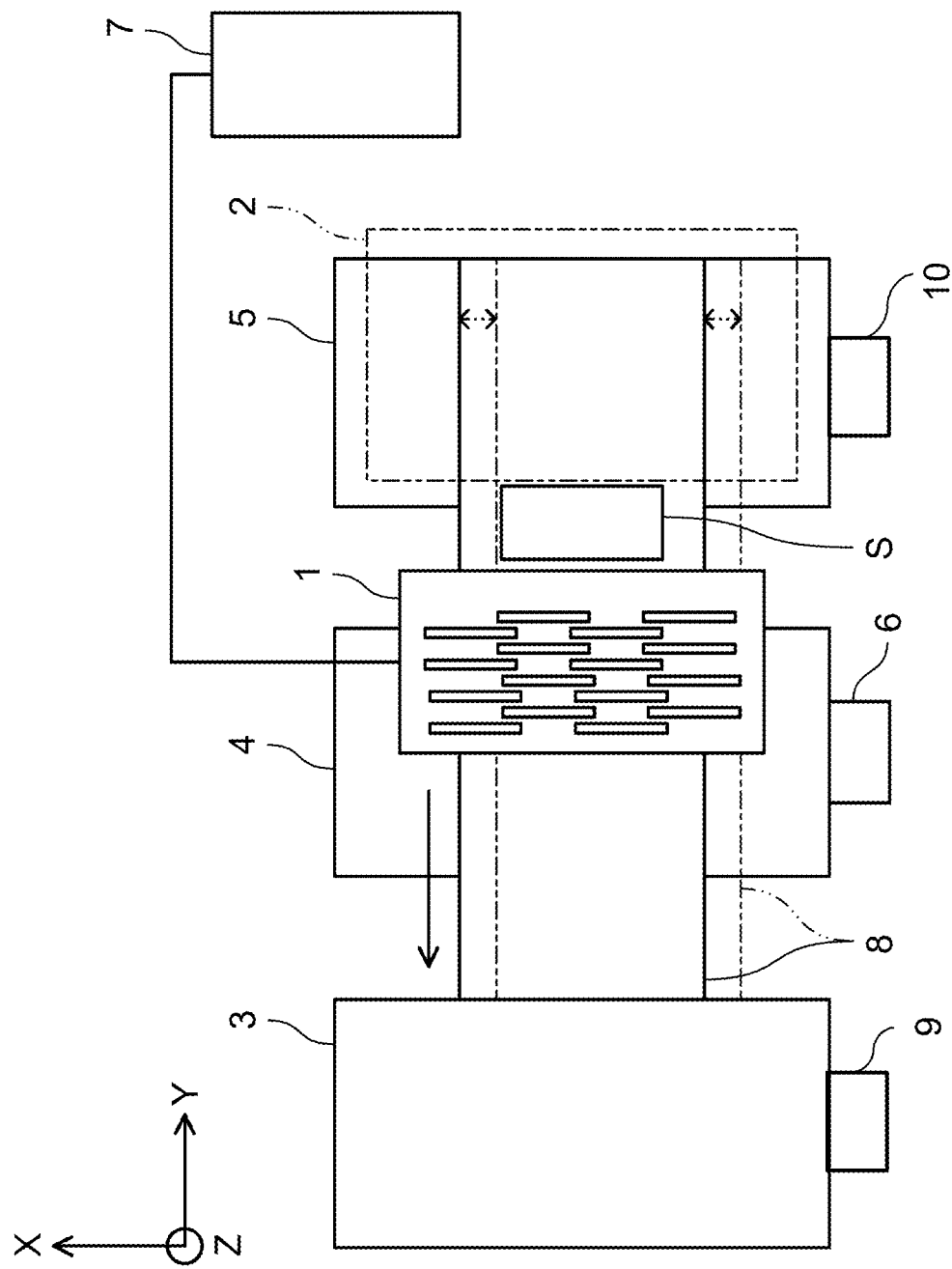
FIG. 2 is a plan view of the inspection machine according to the present exemplary embodiment.

FIG. 1 illustrates a side view of an inspection machine according to the present exemplary embodiment, and FIG. 2 illustrates a plan view of the inspection machine according to the present exemplary embodiment. As illustrated in FIGS. 1 and 2, the inspection machine includes imaging device 1, lighting device 2, rollers 3 to 5, rotary encoder 6, and image processing device 7. Transport belt 8 is wound around the outer circumferences of rollers 3 to 5.

The inspection machine inspects sheet S (inspection object) configured in the form of a sheet. Specifically, the inspection machine detects an object on sheet S. Here, the inspection machine detects defects and foreign matter in sheet S as an object. These defects include not only defective or insufficient portions in the production of sheet S such as short circuit or disconnection in sheet S to be inspected, but also damage to sheet S (for example, scratch marks caused by sheet S coming into contact with other members). When a detected object is larger than a predetermined size, the inspection machine determines that sheet S contains an object. Sheet S is transported in the direction of the arrow illustrated by the solid line in FIGS. 1 and 2 while being placed on transport belt 8.

Imaging device 1 includes a plurality of image sensors and images sheet S transported by transport belt 8. Here, imaging device 1 is configured as a line sensor for imaging sheet S between rollers 4 and 5. Imaging device 1 transmits the pixel signal output from the image sensor to image processing device 7. In the following description, the scanning direction of imaging device 1 defined as an X direction, the sub-scanning direction of imaging device 1 defined as a Y direction, and the direction perpendicular to the X and Y directions is defined as a Z direction.

Lighting device 2 includes, for example, a light source composed of an LED, a laser, a halogen light source, or the like, and irradiates the scanning region (sheet 5) of imaging device 1 with light between rollers 4 and 5. Specifically, lighting device 2 is installed so that the light irradiation direction is tilted at an angle of about 10° with respect to transport belt 8. That is, imaging device 1 and lighting device 2 are composed of a dark field optical system.

Roller 3 is rotated by drive mechanism 9 to drive transport belt 8 and transport sheet S in the direction of the solid line arrow in the drawing. Drive mechanism 9 is, for example, an actuator connected to roller 3. The actuator is, for example, a rotary motor.

Roller 5 meanders on transport belt 8 in the X direction (dashed line arrow direction in FIG. 2) at a predetermined speed by drive mechanism 10. By the meandering on transport belt 8 in the X direction, the position of sheet S in a post-inspection process by the inspection machine is aligned. Drive mechanism 10 is, for example, an actuator connected to roller 5, which makes roller 5 reciprocate in the X direction.

Rotary encoder 6 detects the rotation speed of roller 4 and detects the amount of movement of sheet S transported by transport belt 8. Rotary encoder 6 transmits the detected movement amount of sheet S to image processing device 7.

Image processing device 7 is, for example, a computer, and generates a plurality of captured images by the image generation method described later based on the pixel signal received from imaging device 1 and the movement amount of sheet S detected by rotary encoder 6. Image processing device 7 extracts the images of object E from the plurality of captured images generated by the object extraction method described later. Image processing device 7 combines the extracted images of object E by the image combining method described later to generate a combined image of object E.

About Imaging Device

Figure 3:
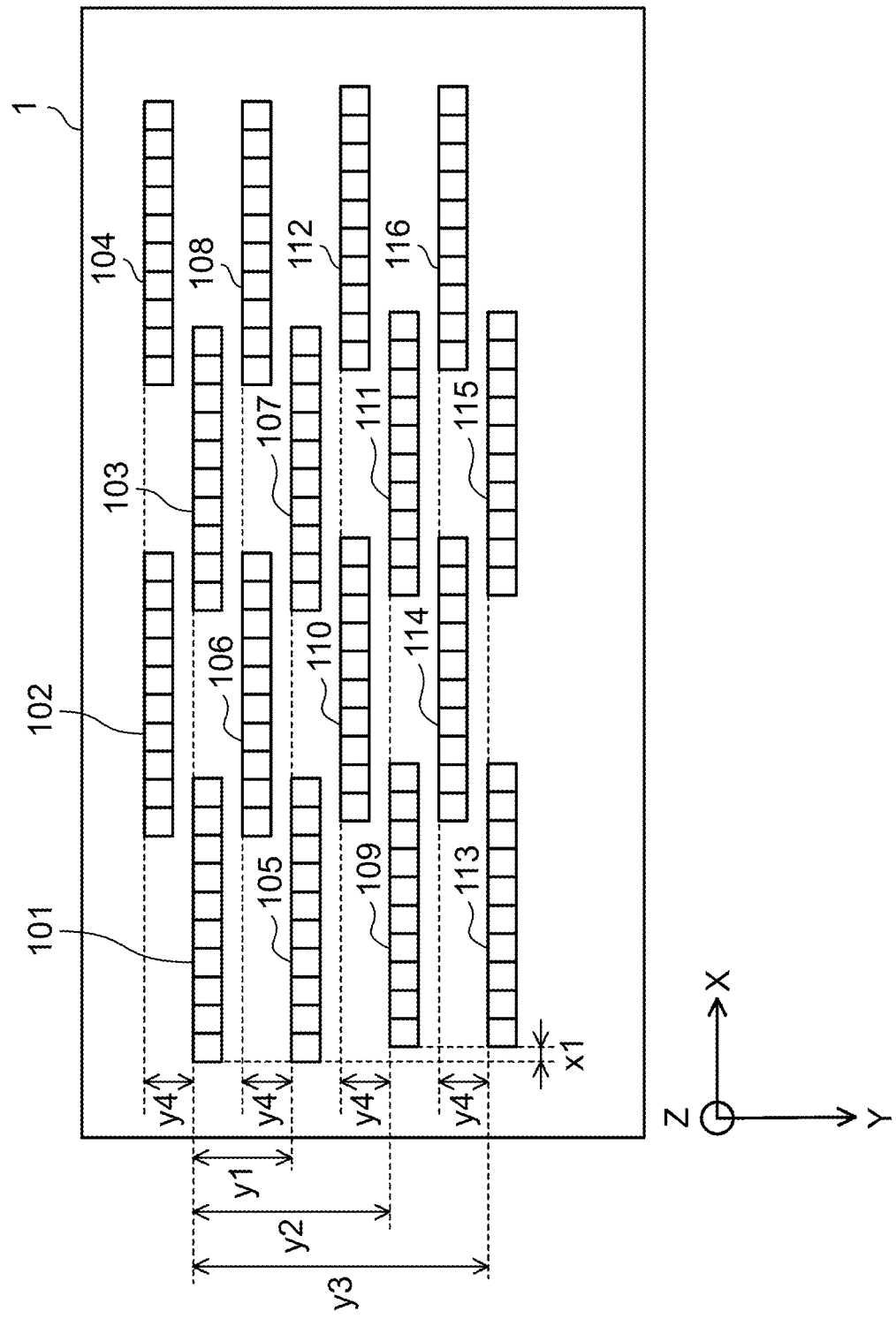
FIG. 3 is a plan view illustrating an example of disposition of an image sensor in an imaging device according to the present exemplary embodiment.

FIG. 3 is a plan view illustrating an example of disposition of image sensors in the imaging device according to the present exemplary embodiment. As illustrated in FIG. 3, imaging device 1 includes image sensors 101 to 116. Each of image sensors 101 to 116 is composed of a plurality of pixels.

Here, a case where image processing device 7 generates a combined image of an object from four images will be described as an example. In the present exemplary embodiment, the number of divisions nx of one pixel in the combined image in the X direction is 2, and the number of divisions ny in the Y direction is 2. Resolution x in the X direction of each pixel constituting image sensors 101 to 116 is 42.3 μm, and resolution y in the Y direction is 42.3 μm. Image sensors 101 to 116 have 432 pixels (18273.6 μm) in the X direction and one pixel (42.3 μm) in the Y direction, respectively. In order to improve the detection accuracy of the object, it is preferable that the plurality of images to be combined are generated by a plurality of image sensors located at positions shifted by a unit smaller than one pixel. The number of divisions nx is an index of how much the plurality of image sensors are shifted from a reference sensor (for example, image sensor 101) in the X direction. For example, when the number of divisions nx is 2, it means that two image sensors are shifted by ½ pixel (0.5 pixel) in the X direction. Similarly, the number of divisions ny indicates how much the plurality of image sensors are shifted from a reference sensor (for example, image sensor 101) in the Y direction. For example, when the number of divisions ny is 2, it means that two image sensors are shifted by ½ pixel (0.5 pixel) in the Y direction.

Image sensor 105 is disposed at a position at distance y1 in the Y direction with reference to image sensor 101. Distance y1 is y/ny+a×y. a is a coefficient (integer of 0 or more). Image sensor 105 is disposed with a distance of 0.5 pixels (y/ny) added to a times resolution y with reference to image sensor 101. Here, a=94. Therefore, distance y1=3997.35 μm. Image sensor 105 is disposed at the same position in the X direction with reference to image sensor 101.

Image sensor 109 is disposed at a position where distance y2 is in the Y direction and distance x1 is in the X direction with reference to image sensor 101. Distance y2 is 0+b×y. That is, image sensor 109 is disposed with distance b times resolution y with reference to image sensor 101. "0" means that image sensor 109 is shifted from image sensor 101 by an integral multiple of one pixel in the Y direction and does not include the shift of the fractional portion after the decimal point. b is a coefficient (integer of 0 or more). Here, b=189. Therefore, distance y2=7994.7 μm. Distance x1 is x/nx+cxx. c is a coefficient (integer of 0 or more). Here, c=0. Therefore, distance x1=21.15 μm.

Image sensor 113 is disposed at a position where distance y3 is in the Y direction and distance x1 is in the X direction with reference to image sensor 101. Distance y3 is y/ny+ dxy. d is a coefficient (integer of 0 or more). Here, d=283. Therefore, distance y3=11992.05 μm.

With the above configuration, image sensor 105 is disposed so as to shift from image sensor 101 by 94.5 pixels in the Y direction. Ignoring the integer portion, image sensor 105 is disposed so as to shift from image sensor 101 by 0.5 pixels in the Y direction. Image sensor 109 is disposed so as to shift from image sensor 101 by 0.5 pixels in the X direction. Image sensor 113 is disposed so as to shift from image sensor 101 by 0.5 pixels in the X direction and 283.5 pixels in the Y direction. Ignoring the integer portion, image sensor 113 is disposed so as to shift from image sensor 101 by 0.5 pixels in the X direction and 0.5 pixels in the Y direction.

Similarly, image sensors 106, 107, and 108 are disposed at positions at distance y1 in the Y direction with reference to image sensors 102, 103, and 104, respectively. Image sensors 110, 111, and 112 are disposed at positions where distance y2 is in the Y direction and distance x1 is in the X direction, respectively, with reference to image sensors 102, 103, and 104. Image sensors 114, 115, and 116 are disposed at positions where distance y3 is in the Y direction and distance x1 is in the X direction, respectively, with reference to image sensors 102, 103, and 104.

Image sensor 102 is disposed so as to partially overlap image sensor 101 in the X direction. Here, image sensor 102 overlaps image sensor 101 by 423 μm (for 10 pixels) in the X direction. In the Y direction, the sensor is disposed at a position at distance y4 (21 pixels in the present example) with respect to image sensor 101. Therefore, image sensor 102 is disposed at a distance of 17850.6 μm (422 pixels) in the X direction and −888.3 μm (21 pixels) in the Y direction with reference to image sensor 101.

Image sensor 103 is disposed so as to partially overlap image sensor 102 in the X direction. Here, image sensor 103 overlaps image sensor 102 by 423 μm (for 10 pixels) in the X direction. In the Y direction, the sensor is disposed at a position at distance y4 (21 pixels) with respect to image sensor 102. Therefore, image sensor 103 is disposed at a distance of 17850.6 μm (422 pixels) in the X direction and 888.3 μm (21 pixels) in the Y direction with reference to image sensor 102. In the Y direction, the sensor is disposed at a position at distance y4 (21 pixels) with respect to image sensor 102. Image sensor 104 is disposed so as to partially overlap image sensor 103 in the X direction. Here, image sensor 104 overlaps image sensor 103 by 423 μm (for 10 pixels) in the X direction. In the Y direction, the sensor is disposed at a position at distance y4 (21 pixels) with respect to image sensor 103. Therefore, image sensor 104 is disposed at a distance of 17850.6 μm (422 pixels) in the X direction and −888.3 μm (21 pixels) in the Y direction with reference to image sensor 103.

Similarly, image sensors 106, 110, and 114 are disposed at a distance of 422 pixels in the X direction and a distance of −21 pixels in the Y direction with reference to image sensors 105, 109, and 113, respectively. Image sensors 107, 111, and 115 are disposed at a distance of 422 pixels in the X direction and a distance of 21 pixels in the Y direction, respectively, with reference to image sensors 106, 110, and 114. Image sensors 108, 112, and 116 are disposed at a distance of 422 pixels in the X direction and a distance of −21 pixels in the Y direction with reference to image sensors 107, 111, and 115, respectively.

About How to Generate Captured Images

Figure 4:
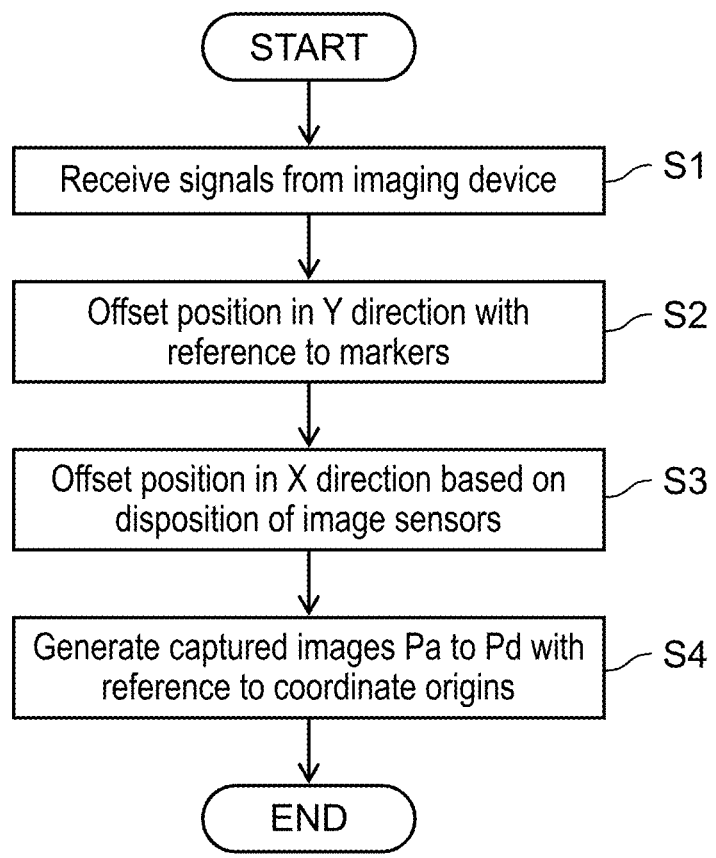
FIG. 4 is a flowchart for illustrating a flow of an image generation method in an image processing device according to the present exemplary embodiment.
Figure 5A:
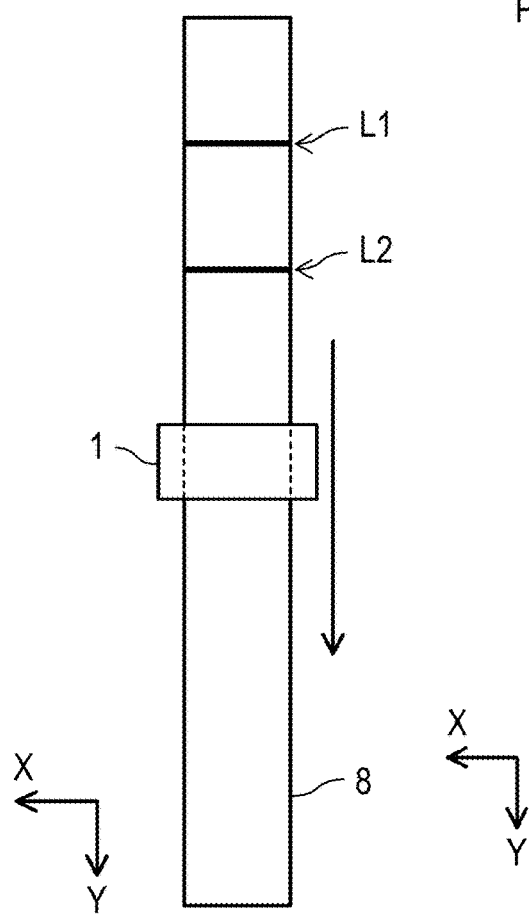
FIG. 5A is a view for illustrating the image generation method in the image processing device according to the present exemplary embodiment.
Figure 5B:
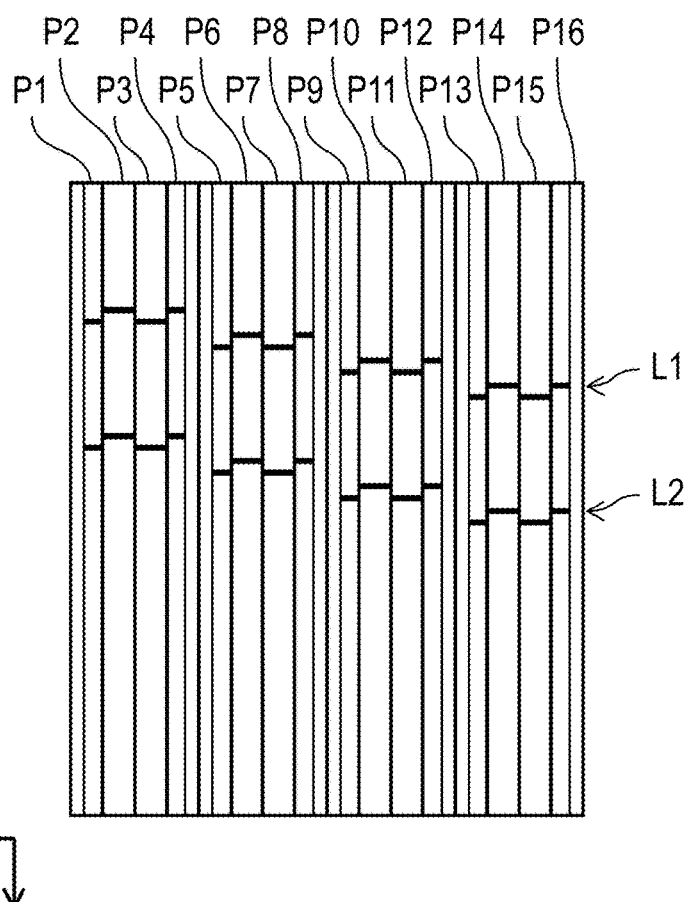
FIG. 5B is a view for illustrating the image generation method in the image processing device according to the present exemplary embodiment.
Figure 6A:
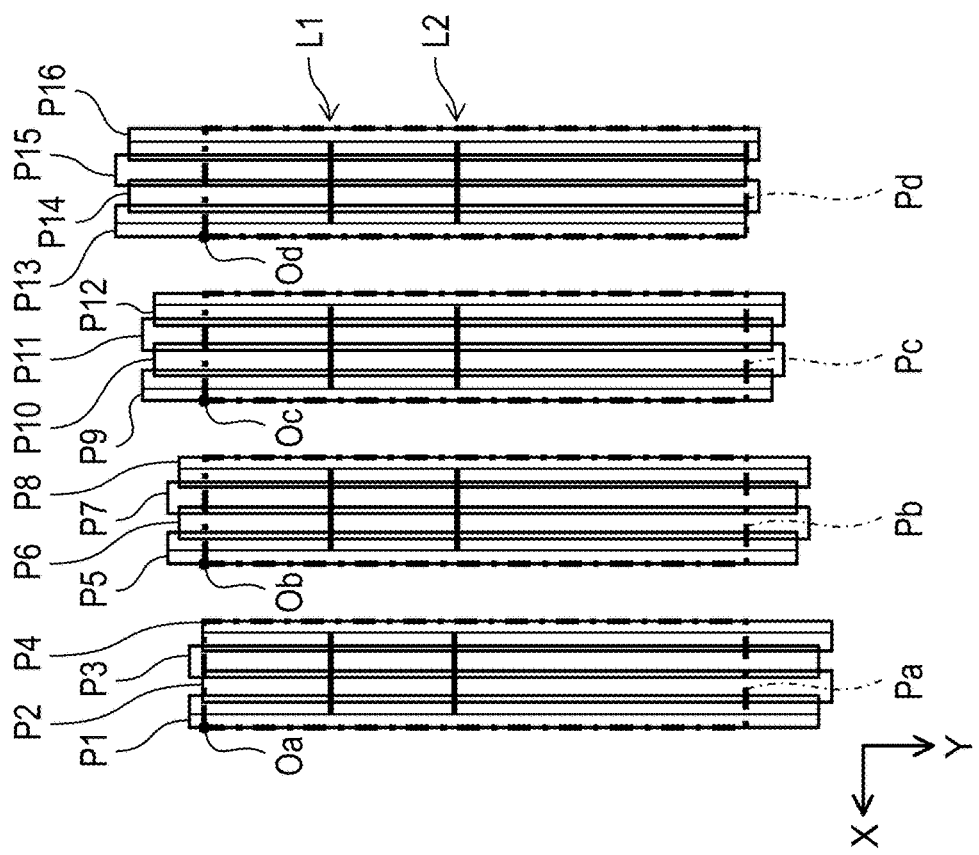
FIG. 6A is a view for illustrating the image generation method in the image processing device according to the present exemplary embodiment.
Figure 6B:
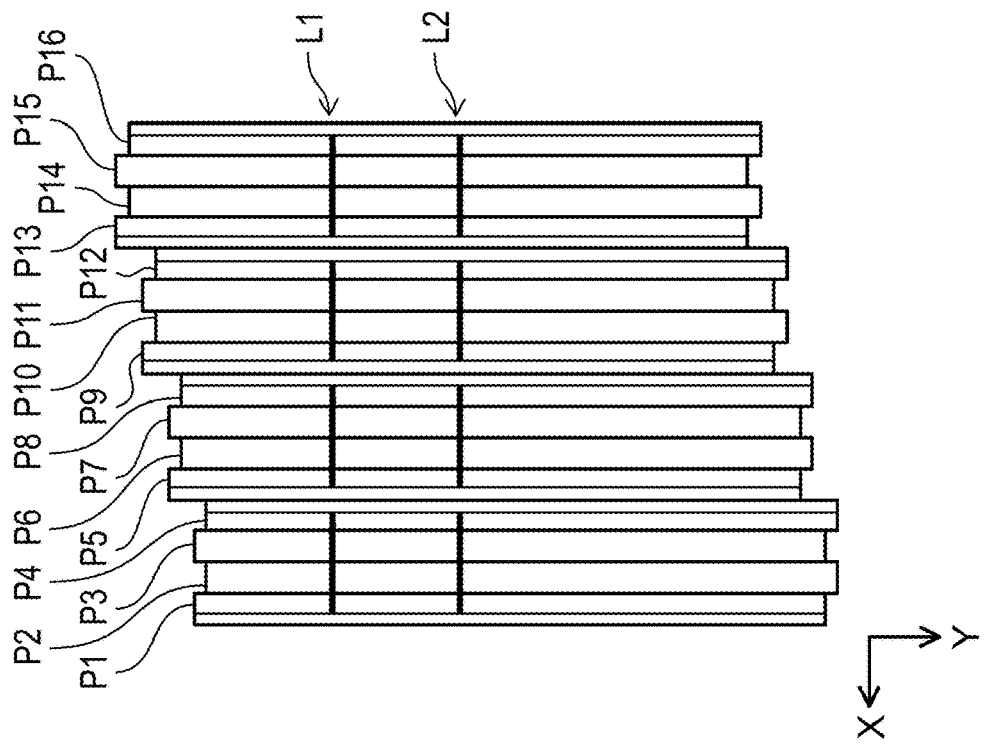
FIG. 6B is a view for illustrating the image generation method in the image processing device according to the present exemplary embodiment.

The image generation method in the image processing device will be described with reference to FIGS. 1 to 6B. FIG. 4 is a flowchart for illustrating a flow of the image generation method in the image processing device, and FIGS. 5A, 5B, 6A, and 6B are views for illustrating the image generation method in the image processing device. Specifically, FIG. 5A is a plan view illustrating a marker position on the transport belt, FIG. 5B is a captured image generated based on signals from imaging device 1, FIG. 6A is a captured image offset in the Y direction, and FIG. 6B is a captured image offset in the X direction.

In step S1, image processing device 7 generates a captured image of sheet S based on the pixel signals (pixel signals output from image sensors 101 to 116) received from imaging device 1 and the movement amount of sheet S detected by rotary encoder 6.

As illustrated in FIG. 5A, markers L1 and L2 extending in the X direction are formed on transport belt 8. Image processing device 7 receives the pixel signals output by image sensors 101 to 116 and generates captured images (images P1 to P16) before processing. Images P1 to P16 are images generated based on the pixel signals of image sensors 101 to 116, respectively.

In step S2, image processing device 7 offsets (corrects) the position of the captured image in the Y direction with reference to markers L1 and L2. As illustrated in FIGS. 5B and 6A, image processing device 7 corrects the positions of images P1 to P16 in the Y direction so that the positions of markers L1 and L2 in the Y direction match.

In step S3, the position of the captured image in the X direction is offset (corrected) based on the disposition of image sensors 101 to 116. As illustrated in FIGS. 6A and 6B, the positions of images P1 to P16 in the X direction are corrected (offset) based on the disposition (overlap in the X direction) of image sensors 101 to 116 in the X direction. For example, since image sensors 101 and 102 overlap each other by 10 pixels in the X direction, image processing device 7 superimposes images P1 and P2 by 10 pixels in the X direction. At this time, the overlapping portion of images P1 and P2 has a luminance gradation of either one or an averaged luminance gradation of both.

Here, image processing device 7 superimposes images P1 to P4, P5 to P8, P9 to P12, and P13 to P16 by 10 pixels in the X direction, respectively.

In step S4, image processing device 7 extracts (generates) a predetermined region (region surrounded by chain line in FIG. 6B) with reference to each of coordinate origins Oa, Ob, Oc, and Od as captured images Pa, Pb, Pc, and Pd in images P1 to P4, P5 to P8, P9 to P12, and P13 to P16 superimposed in the X direction. Coordinate origin Ob is a point offset by 1/ny pixels in the Y direction with respect to coordinate origin Oa (here, 0.5 pixels in the Y direction). Coordinate origin Oc is a point offset by 1/nx pixels in the X direction with respect to coordinate origin Oa (here, 0.5 pixels in the X direction). Coordinate origin Od is a point offset by 1/nx pixels in the X direction and 1/ny pixels in the Y direction (here, 0.5 pixels in the Y direction and 0.5 pixels in the X direction) with respect to coordinate origin Oa.

With the above method, image processing device 7 generates four captured images Pa to Pd based on the pixel signals of image sensors 101 to 116.

About Image Extraction Method of Object and Image Combining Method of Object

Figure 8:
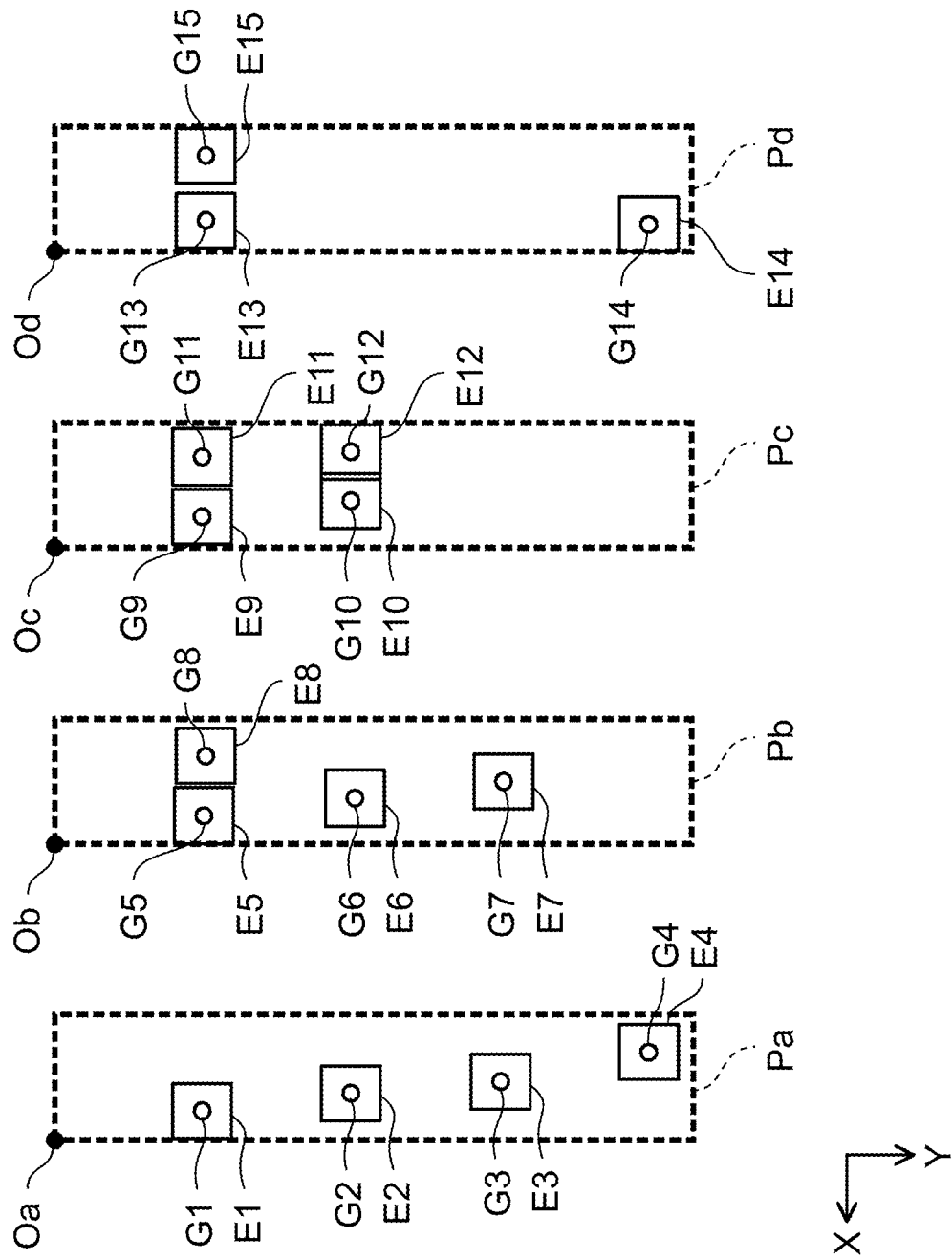
FIG. 8 is a view for illustrating the image combining method of the object in the image processing device according to the present exemplary embodiment.

An image extraction method of an object and an image combining method of an object in an image processing device will be described with reference to FIGS. 1 to 9B. FIG. 7 is a flowchart for illustrating a flow of the image extraction method of the object and the image combining method of the object in the image processing device, and FIG. 8 is a view for illustrating the image combining method of the object in the image processing device.

Next, image processing device 7 extracts and combines the images of object E based on captured images Pa to Pd.

In step S5, image processing device 7 performs filter processing on images Pa to Pd as preprocessing. For example, image processing device 7 performs filter processing for emphasizing object E (defect and foreign matter), such as median filter processing, smoothing filter processing, and comparative difference filter processing, or filter processing for removing the influence of the background on images Pa to Pd.

In step S6, image processing device 7 performs binarization processing on images Pa to Pd.

In step S7, image processing device 7 extracts images of object E in images Pa to Pd based on a first feature amount of object E. For example, as the first feature amount of object E, the area, maximum length, aspect ratio, vertical width, horizontal width, binarization threshold value (luminance threshold), luminance gradation (maximum value, minimum value, average value, and the like), fillet diameter (maximum value, minimum value, and the like), and main axis length (maximum value, minimum value, and the like) of object E are used. Image processing device 7 may use image data of sheet S that does not include the object as the first feature amount to extract the images of object E by comparing the image data with images Pa to Pd. When lighting device 2 can emit light in a certain direction, image processing device 7 may use the light component in a predetermined direction as the first feature amount to extract object E when the light component in the predetermined direction exceeds a predetermined value.

When object E is included in more than a predetermined pixel, image processing device 7 extracts images of object E. Here, image processing device 7 extracts images of object E when object E is included in two or more pixels.

In step S8, image processing device 7 links (associates) the extracted images of object E based on a second feature amount (feature amount) of object E. The second feature amount of object E is the area, aspect ratio, center of gravity (center of gravity in area, luminance value of center of gravity, and the like), center or center of gravity of a rectangle circumscribed in the image of object E, luminance gradation (maximum value, minimum value, average value, and the like), fillet diameter (maximum value, minimum value, and the like), and main axis length (maximum value, minimum value, and the like) of object E, and the like. Here, image processing device 7 links the images of object E based on the center of gravity (center of gravity in area) of the images of object E.

As illustrated in FIG. 8, image processing device 7 extracts objects E1 to E4 from image Pa, extracts objects E5 to E8 from image Pb, extracts objects E9 to E12 from image Pc, and extracts objects E13 to E15 from image Pd. In this case, image processing device 7 links the images of objects E1 to E15 based on respective centers of gravity G1 to G15 of objects E1 to E15. Specifically, when images Pa to Pd are superimposed, image processing device 7 links the images of object E at the position where the center of gravity correspond.

Here, image processing device 7 links the images of object E when the position of the center of gravity of object E is within a predetermined range. The predetermined range is preferably 5 pixels (0.1 mm) to 50 pixels (1.0 mm), and here, 16 pixels (0.32 mm) are set. However, the present disclosure is not limited thereto, and the predetermined range may be set large by setting the distance between image sensors 101 to 116.

First, in FIG. 8, image processing device 7 links the images of object E in image Pa with the images of object E in images Pb, Pc, and Pd. Specifically, since the centers of gravity G5, G9, and G13 are within the predetermined range of the center of gravity G1, image processing device 7 links the images of objects E1, E5, E9, and E13. Since the centers of gravity G6 and G10 are within the predetermined range of the center of gravity G2, image processing device 7 links the images of objects E2, E6, and E10. Since the center of gravity G7 is within the predetermined range of the center of gravity G3, image processing device 7 links the images of objects E3 and E7.

Next, image processing device 7 links the image of the object in image Pb with the image of the object in images Pc and Pd. Since the centers of gravity G11 and G15 are within the predetermined range of the center of gravity G8, image processing device 7 links the images of objects E8, E11, and E15.

Next, image processing device 7 links the image of the object in image Pc with the image of the object in image Pd. In FIG. 8, image processing device 7 does not link the images of object E because there is no object E that is not linked, among the images of object E whose center of gravity corresponds in images Pc and Pd.

In step S9, image processing device 7 combines the images of object E based on a third feature amount. The third feature amount of object E is the area, aspect ratio, center of gravity of the image of object E, the rectangular center of gravity circumscribing the image of object E, and the like. Here, image processing device 7 combines the images of object E based on the centers of gravity of the images of object E.

Specifically, image processing device 7 doubles the image size of the extracted object E in the X direction and the Y direction, respectively. Image processing device 7 superimposes the linked images of object E around the centers of gravity (third feature amount) of the images of object E, adds a luminance gradation for each pixel, and averages the luminance gradations.

For example, since the images of objects E1, E5, E9, and E13 are linked in FIG. 8, image processing device 7 generates an image of object E based on the four images.

In step S10, image processing device 7 outputs the generated image of object E (for example, the image is displayed on a display or the like illustrated in the drawing). At this time, image processing device 7 outputs the combined image of object E and outputs the images of object E that is not linked. In FIG. 8, image processing device 7 outputs the combined image of objects E1, E5, E9, and E13, the combined image of objects E2, E6, and E10, and the combined images of objects E8, E11, and E15 as the combined image of object E and outputs an image of object E4, an image of object E12, and an image of object E14 as images of object E that is not linked. Image processing device 7 performs image combining processing on a plurality of linked images of the objects to generate a combined image and outputs the combined image. On the other hand, image processing device 7 skips the image combining processing of the images of the independent object that is not linked and outputs the images as they are. For example, the image of object E4 is output as it is without being combined with the images of the corresponding region of images Pb to Pd (the background image in which the object does not exist). The quality of the image of object E4 is higher than the quality of the combined image of the image of object E4 and the background image. It is possible to improve the detection accuracy of object E4 by outputting the image of object E4 as it is.

FIGS. 9A and 9B are views comparing the inspection machine according to the present exemplary embodiment and a combined image of the object output by the inspection machine in the related art. Specifically, FIG. 9A is a combined image of the object output by the inspection machine according to the present exemplary embodiment, and FIG. 9B is a combined image of the object output by the inspection machine in the related art.

In the inspection machine in the related art, image processing device 7 generates captured images Pa to Pd by the above-described captured image generation method. Image processing device 7 offsets (corrects) the positions of captured images Pa to Pd in the X and Y directions based on the disposition of image sensors 101 to 116, combines captured images Pa to Pd, and then extracts an image of object E.

As illustrated in FIGS. 9A and 9B, the image of object E output by the inspection machine according to the present exemplary embodiment is clearer than the image output by the inspection machine in the related art. In the inspection machine in the related art, offset (correction) is performed by disposing the image sensor, but since the way the light hits the inspection object is not taken into consideration, the position of the image of object E for each of the captured images to be combined shifts, and the combined image of object E becomes unclear. On the other hand, in the present exemplary embodiment, after an image of object E is extracted for each of the captured images, the extracted images of object E are combined around the center of gravity of object E. As a result, since it is possible to suppress the shift of the position of the images of object E to be combined, it is possible to make the combined image of object E clear.

With the above configuration, the inspection machine inspects sheet S by detecting the size of object E on sheet S. The present inspection machine includes image sensors 101 to 116 that image sheet S, lighting device 2 that irradiates sheet S with light, and image processing device 7 that generates an image of object E from the outputs of image sensors 101 to 116. Image processing device 7 generates captured images Pa to Pd that include an image in a predetermined range of sheet S in common based on the outputs from image sensors 101 to 116. Image processing device 7 extracts the images of object E on sheet S for each of generated captured images Pa to Pd. Image processing device 7 links (associates) the extracted images of object E with each other based on the centers of gravity (feature amount) of object E reflected in the images. Image processing device 7 combines the linked images of object E with each other.

According to one aspect of the present disclosure, as illustrated below, in an inspection machine and an inspection method using a plurality of image sensors, since it is possible to detect the size of an object in an inspection object, it is possible to improve the detection reproducibility and the detection probability of the object in the inspection object.

When captured images Pa to Pd are combined based on the disposition of image sensors 101 to 116, depending on how the light hits sheet S, the position of object E for each of captured images Pa to Pd may significantly shift. Therefore, the shift of the position of object E cannot be corrected by correcting captured images Pa to Pd depending on the position of the image sensor, and object E may not be detected. On the other hand, in the present inspection machine, an image of object E is extracted for each of captured images Pa to Pd, and the extracted images of object E are associated with each other based on the feature amount and combined. As a result, since the shift of the position of object E for each of captured images Pa to Pd can be suppressed, it is possible to accurately combine the images of object E, and it is possible to accurately detect the size of the object in the inspection object. Therefore, it is possible to improve the detection reproducibility and the detection probability of the object (foreign matter or defect) in the inspection object (sheet S).

Image processing device 7 outputs an image of object E that is not linked (not associated) without being combined with an image of another object E. Thereby, it is possible to improve the detection reproducibility and the detection probability of the object on the inspection object (sheet S).

It is assumed that each of image sensors 101 to 116 has a resolution x in the X direction and a resolution y in the Y direction. In this case, image sensors 101 to 104, 105 to 108, 109 to 112, and 113 to 116 are disposed side by side for each $(1/nx)+mx$ pixel in the X direction, respectively. Image sensors 101, 105, 109, and 113 are disposed side by side in the Y direction for each $(1/ny)+py$ pixel. Image sensors 102, 106, 110, and 114 are disposed side by side in the Y direction for each $(1/ny)+py$ pixel. Image sensors 103, 107, 111, and 115 are disposed side by side in the Y direction for each $(1/ny)+py$ pixel. Image sensors 104, 108, 112, and 116 are disposed side by side in the Y direction for each $(1/ny)+py$ pixel. However, nx is the number of divisions of a pixel in the X direction, ny is the number of divisions of a pixel in the Y direction, and m and p are integer coefficients. As a result, since one pixel is divided into the number of divisions nx in the X direction and the number of divisions ny in the Y direction, it is possible to improve the resolution in the X and Y directions of the imaging device.

Other Exemplary Embodiments

As described above, an exemplary embodiment has been described as an example of the techniques disclosed in the present application. However, the technique in the present disclosure is not limited thereto, and can be applied to exemplary embodiments in which changes, replacements, additions, omissions, and the like are made as appropriate.

In the above exemplary embodiment, imaging device 1 and lighting device 2 are composed of a dark field optical system, but may be composed of a bright-field optical system. Although imaging device 1 is configured as a line sensor, but may be configured as an area sensor. Image processing device 7 may generate a moving image from the pixel signals output from image sensors 101 to 116, or may generate a still image.

FIG. 10 is a view for illustrating a relationship between a type of sensor, a type of moving image, and an optical system in the inspection machine according to the present exemplary embodiment. An imaging error of more than the set resolution is indicated by A, an imaging error of less than the set resolution to $1/10$ or more of the set resolution is indicated by B, and an imaging error of less than $1/10$ of the set resolution is indicated by C. As illustrated in FIG. 10, the present inspection machine can generate the clearest combined image of object E when imaging device 1 and lighting device 2 are composed of a dark field optical system. This is because the background (grand level) of the object does not shine (brightness of the background where there is no foreign matter has low gradations) and the object shines when light hits the object at a low angle so that the SN ratio (signal noise (luminance of foreign matter/luminance of background)) increases. Even if lighting device 2 is composed of a bright-field optical system, the same effect as that of the present inspection machine can be obtained, and the same effect can be obtained even if a moving image is generated from the image sensors.

The image sensors of imaging device 1 are not limited to the above-mentioned disposition. The number of image sensors in imaging device 1 is not limited to the above-mentioned number.

The number of pixels constituting each image sensor is not limited to the number of pixels described above.

The captured images generated by image processing device 7 are not limited to four. Image processing device 7 may generate at least two captured images.

The inspection object to be inspected by the present inspection machine is not limited to the one configured in the form of a sheet.

The inspection machine of the present disclosure can be used for inspecting foreign matter and defects contained in members used in semiconductors, electronic devices, secondary batteries and the like.

What is claimed is:

1. An inspection machine that inspects an inspection object by detecting a size of an object in the inspection object, the inspection machine comprising:
    a plurality of image sensors that image the inspection object; and
    an image processing device that generates an image of the object from outputs of the plurality of image sensors, the outputs being results of imaging by the plurality of image sensors,
    wherein the image processing device
        generates a plurality of captured images including images of a predetermined range of the inspection object in common in accordance with the outputs of the plurality of image sensors,
        extracts at least one image of the object in the inspection object from the plurality of generated captured images,
        when there are at least two images of the object extracted by the image processing device:
        associates the at least two images extracted by the image processing device with each other based on feature amounts of the object reflected in the images extracted; and
        combines, with each other, the at least two images of the object associated by the image processing device, and
        when there is only one image of the object extracted by the image processing device, outputs the one image of the object that is not combined with any other image.

2. The inspection machine of claim 1,
    wherein each of the feature amounts includes any one of an area, an aspect ratio, a center of gravity, a center and a center of gravity of a rectangle circumscribed by the object, a luminance gradation, a fillet diameter, and a length of a main axis of the object reflected in a corresponding one of the images extracted.

3. The inspection machine of claim 1,
    wherein the plurality of image sensors include a first image sensor and a second image sensor, the second image sensor being disposed apart from the first image sensor by a first distance in a scanning direction in which the first image sensor scans the inspection object and apart from the first image sensor by a second distance in a sub-scanning direction which is a direction perpendicular to the scanning direction, and
    the first distance is indicated by $(x/nx)+m \times x$,
    the second distance is indicated by $(y/ny)+p \times y$,
    where x indicates a resolution in the scanning direction, y indicates a resolution in the sub-scanning direction, nx is the number of divisions of a pixel in the scanning direction, ny is the number of divisions of a pixel in the sub-scanning direction, and m and p are integer coefficients.

4. The inspection machine of claim 1, further comprising:
    a transport belt that transports the inspection object;
    a first drive mechanism that moves the transport belt in a sub-scanning direction perpendicular to a scanning direction in which the plurality of image sensors scan the inspection object; and
    a second drive mechanism that makes the transport belt reciprocate in the scanning direction while the first drive mechanism moves the transport belt in the sub-scanning direction.

5. The inspection machine of claim 4,
    wherein the plurality of image sensors scan the inspection object when the inspection object is transported in the sub-scanning direction by the transport belt.

6. The inspection machine of claim 1, further comprising:
    a lighting device that irradiates the inspection object with light,
    wherein the image sensors and the lighting device are of a dark field optical system.

7. An inspection method for inspecting an inspection object by detecting a size of an object in the inspection object by using an inspection machine including a plurality of image sensors that image the inspection object, and an image processing device that generates an image of the object in the inspection object from outputs of the plurality of image sensors, the outputs being results of imaging by the plurality of image sensors, the inspection method comprising:
    generating a plurality of captured images including images of a predetermined range of the inspection object in common in accordance with the outputs of the plurality of image sensors;
    extracting at least one image of the object in the inspection object from the plurality of generated captured images;
    when there are at least two images of the object extracted in the extracting, associating the at least two of the images with each other based on feature amounts of the object reflected in the images extracted, and combining, with each other, the at least two images of the object associated in the associating; and
    when there is only one image of the object extracted in the extracting, outputting the one image of the object that is not combined with any other image.

* * * * *